(12) United States Patent
Saur et al.

(10) Patent No.: US 8,221,673 B2
(45) Date of Patent: Jul. 17, 2012

(54) LOAD BEARING PANEL MEMBER AND METHOD FOR FORMING A LOAD BEARING PANEL MEMBER

(75) Inventors: Calvin A. Saur, West Bloomfield, MI (US); Robert L. Becker, Romeo, MI (US)

(73) Assignee: Century Plastics, Inc., Shelby Township, MI (US)

( * ) Notice: Subject to any disclaimer, the term of this patent is extended or adjusted under 35 U.S.C. 154(b) by 702 days.

(21) Appl. No.: 11/370,414

(22) Filed: Mar. 8, 2006

(65) Prior Publication Data

US 2006/0286351 A1    Dec. 21, 2006

Related U.S. Application Data

(60) Provisional application No. 60/691,790, filed on Jun. 17, 2005.

(51) Int. Cl.
*B29D 22/00* (2006.01)

(52) U.S. Cl. ............ 264/573; 264/453; 264/37.27; 264/37.33; 264/513; 264/515; 264/537; 264/297.2; 264/328.7; 264/328.13

(58) Field of Classification Search .......... 264/241, 264/250, 255, 50, 81, 478, 645, 297.2, 328.1, 264/328.8, 453, 57, 37.27, 37.33, 513, 515, 264/537, 328.7, 328.183; 425/97, 149, 190, 425/533, 591

See application file for complete search history.

(56) References Cited

U.S. PATENT DOCUMENTS

| 3,391,959 | A | * | 7/1968 | Stata ........................ 296/97.23 |
| 5,162,092 | A | * | 11/1992 | Klobucar et al. ............. 264/513 |
| 5,336,460 | A | * | 8/1994 | Hettinga ..................... 264/251 |
| 5,389,315 | A |   | 2/1995 | Yabushita |
| 6,099,767 | A | * | 8/2000 | Tarr et al. .................... 264/40.1 |
| 6,099,771 | A |   | 8/2000 | Hudkins et al. |
| 6,890,477 | B2 |   | 5/2005 | Homann et al. |
| 2003/0011111 | A1 | * | 1/2003 | Pearson ....................... 264/572 |
| 2004/0100116 | A1 |   | 5/2004 | Rhodes et al. |

FOREIGN PATENT DOCUMENTS

GB       2227035    * 7/1990

* cited by examiner

*Primary Examiner* — Jeffrey Wollschlager
*Assistant Examiner* — Stella Yi
(74) *Attorney, Agent, or Firm* — Quinn Law Group, PLLC

(57) ABSTRACT

The present invention provides a method for producing an injection molded panel member having a first portion, a second portion, and an appearance surface portion. The method includes placing the appearance surface portion of the panel member into a mold cavity. The mold cavity preferably includes a first chamber adapted to form the first portion of the panel member, and a second chamber adapted to form the second portion of the panel member. After the appearance surface portion of the panel member is inserted into the mold, molten plastic material and pressurized gas are injected into the first chamber of the mold cavity. After the molten plastic material is injected into the first chamber of the mold, molten plastic material is injected into the second chamber of the mold cavity. The molten plastic is then cooled until it solidifies. After the molten plastic is sufficiently cooled, the pressurized gas is vented and the panel member is removed from the mold.

13 Claims, 3 Drawing Sheets

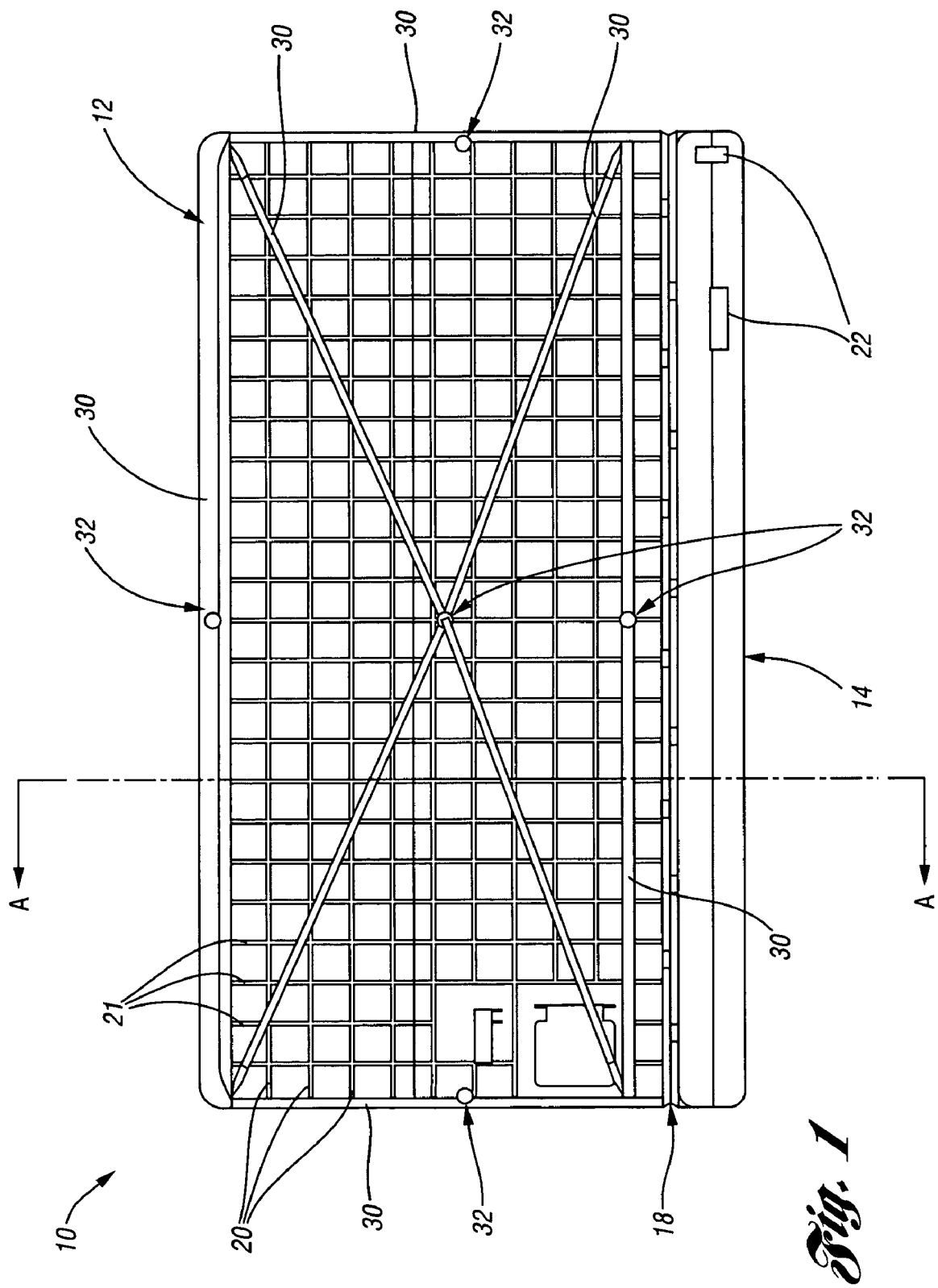

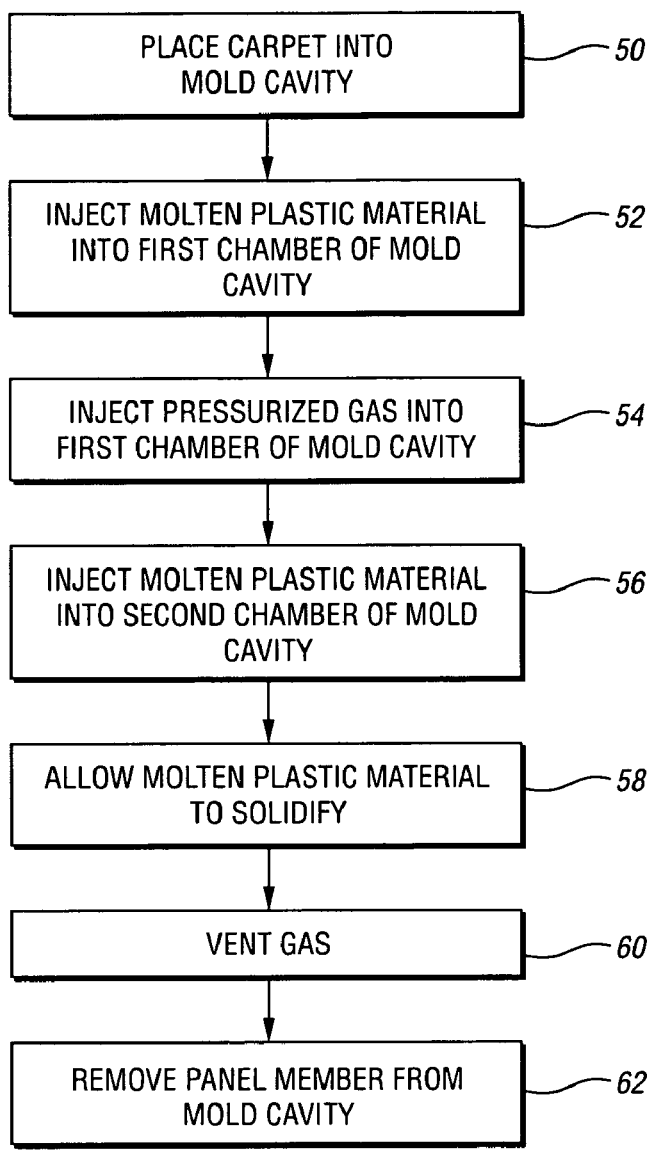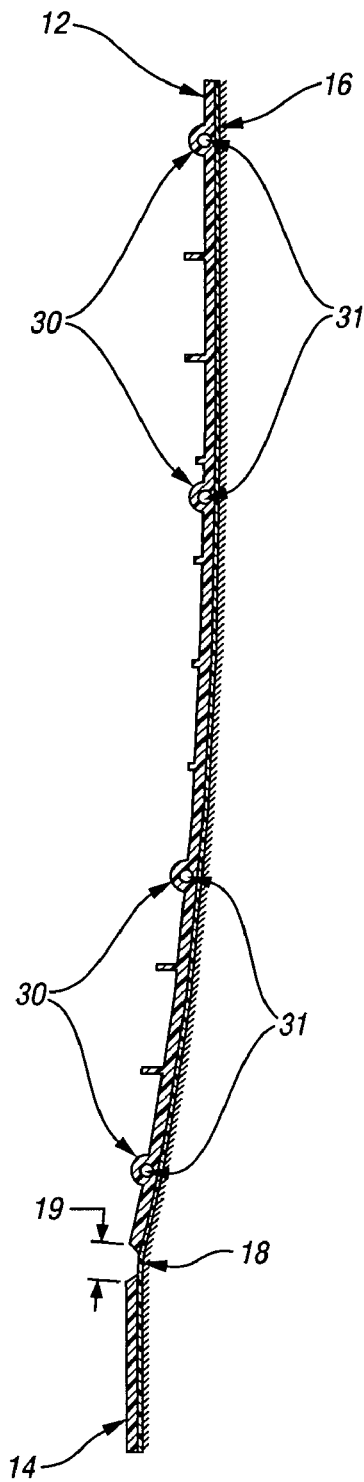

LOAD BEARING PANEL MEMBER AND METHOD FOR FORMING A LOAD BEARING PANEL MEMBER

CROSS-REFERENCE TO RELATED APPLICATION

This application claims the benefit of U.S. Provisional Application No. 60/691,790, filed Jun. 17, 2005, which is hereby incorporated by reference in its entirety.

TECHNICAL FIELD

The present invention is drawn to a method for forming an injection molded panel member, and a load bearing panel member formed thereby.

BACKGROUND OF THE INVENTION

There are numerous known systems for plastic injection molding. In conventional plastic injection molding systems, plastic pellets are melted in an injection molding machine and advanced by a screw ram through an injection nozzle and into a mold cavity. The mold cavity is preferably formed between two mold halves. The molten plastic material in the cavity is allowed to cool and harden in the cavity. When the plastic material has cooled and sufficiently hardened, the two halves of the mold are separated or opened and the part is removed, typically by one or more ejector pins.

Some injection molding systems utilize a gas in the injection molding process and are commonly known as "gas-assisted injection molding" systems. In these systems, the gas is injected into the molten plastic material through the plastic injection nozzle itself, or through one or more pin mechanisms strategically positioned in the mold. It is also possible to inject the gas directly into the molten plastic in the barrel of the injection molding machine. The gas, which typically is an inert gas such as nitrogen, is injected under pressure and forms one or more hollow cavities or channels in the molded part.

Gas-assisted injected molding produces a structure having a hollow interior portion which results in saving weight and material, thereby reducing costs. The pressurized gas applies an outward pressure to force the plastic against the mold surfaces while the article solidifies. This helps provide a better surface on the molded article and reduces or eliminates sink marks and other surface defects. The use of pressurized gas also reduces the cycle time as the gas is introduced and/or migrates to the most fluent inner volume of the plastic and replaces the plastic in those areas which would otherwise require an extended cooling cycle. The pressure of the gas pushing the plastic against the mold surfaces further increases the cooling effect of the mold on the part, thus solidifying the part in a faster manner and reducing the overall cycle time.

SUMMARY OF THE INVENTION

The present invention provides a method for producing a structural or load bearing injection molded panel member. According to a preferred embodiment, the panel member is a floor panel for a van having retractable rear seats wherein the panel member is adapted to cover the rear seats when fully retracted and act as a load floor. The panel member preferably includes a first portion, a second portion and an interior surface portion. The present invention will hereinafter be described according to the preferred embodiment wherein the interior surface portion is a carpet material; however, it should be appreciated that according to alternate embodiments the interior surface portion could also include, for example, a vinyl material or a textile material.

The preferred method of the present invention includes placing the carpet material into a mold cavity configured to produce the panel member. The mold cavity preferably includes a first chamber adapted to form the first portion of the panel member, and a second chamber adapted to form the second portion of the panel member. After the carpet material is inserted into the mold, molten plastic material and pressurized gas are injected into the first chamber of the mold cavity. After the molten plastic material is injected into the first chamber of the mold, molten plastic material is injected into the second chamber of the mold cavity. A sequential gating process is used to achieve this sequence of operations. The molten plastic is then cooled until it solidifies. After the molten plastic is sufficiently cooled, the pressurized gas is vented and the panel member is removed from the mold.

It should be appreciated that the order in which the steps of the preferred embodiment are performed may be varied according to alternate embodiments. For example, according to one alternate embodiment of the present invention, the molten plastic material may be injected into the second chamber of the mold cavity before molten plastic material is injected into the first chamber of the mold cavity. According to yet another alternate embodiment, molten plastic may be injected into the first and second chambers of the mold cavity simultaneously.

The present invention also provides a structural or load bearing panel member and a product by process. The load bearing panel member preferably includes a generally rectangular first portion, a generally rectangular second portion, and a carpet material. The carpet material is attached to the first portion and the second portion such that the carpet material forms an integral or living hinge at a gap therebetween. The first portion of the panel member defines a plurality of solid horizontally disposed ribs and a plurality of solid vertically disposed ribs. The first portion of the load bearing panel member also includes a plurality of hollow ribs formed by the gas assisted injection molding process. The hollow ribs are generally located around the periphery of the first portion of the load bearing panel member as well as in an X-shape originating at the center of the first portion and extending toward the corners thereof. The solid ribs and hollow ribs are adapted to increase strength and rigidity and provide substantial structural or load-bearing capability The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a bottom view of a load bearing panel member in accordance with the present invention;

FIG. 2 is a block diagram illustrating a method of the present invention;

FIG. 3 is a sectional view of the panel member taken along line A-A of FIG. 1;

DESCRIPTION OF THE PREFERRED EMBODIMENTS

Figure 4B:
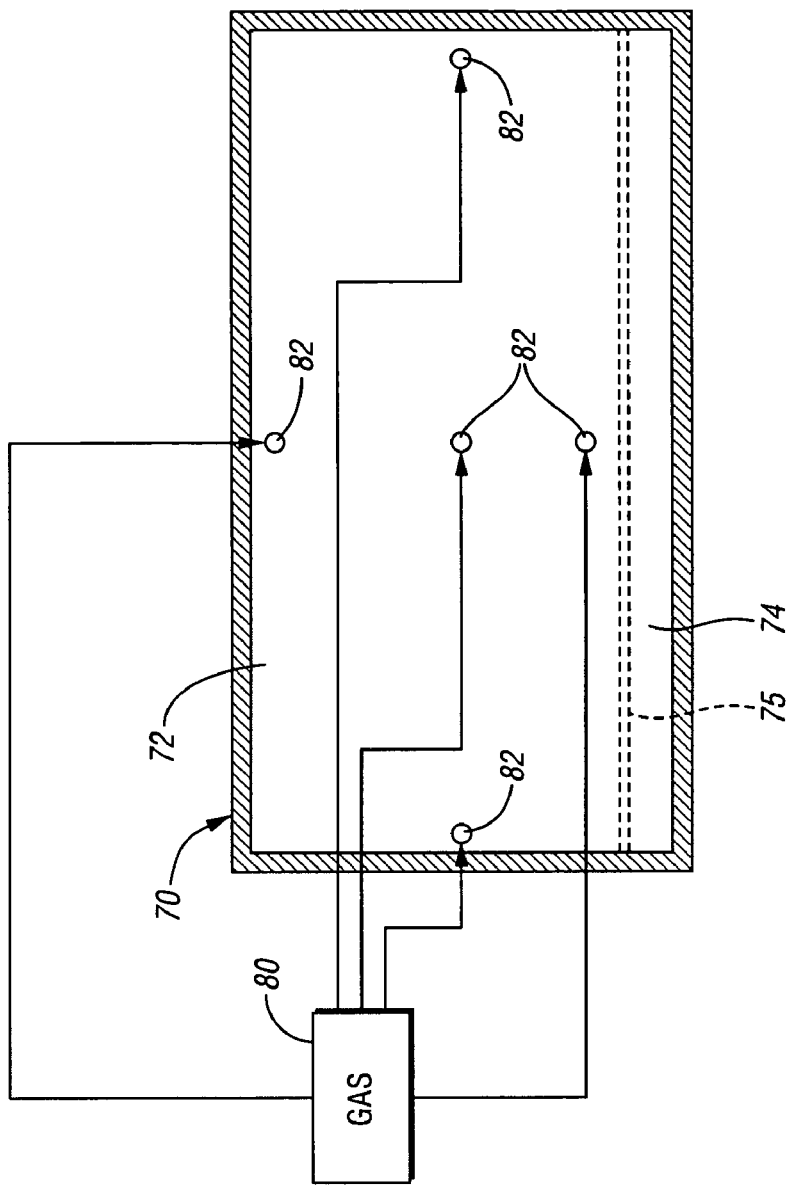
FIG. 4b is a schematic plan view of a mold cavity.

Referring to the drawings, wherein like reference numbers refer to like components, FIG. 1 shows a panel member 10 produced according to a method of the present invention. The panel member 10 will hereinafter be described as a floor panel for a van having retractable rear seats (not shown), wherein the panel member 10 is adapted to cover the rear seats when the seats are fully retracted and also to act as a load floor. It should be appreciated, however, that the method of the present invention may be implemented to produce other conventional panel members as well.

The panel member 10 includes a generally rectangular first portion 12, a generally rectangular second portion 14, and an interior or appearance surface portion 16 (shown in FIG. 3). The present invention will hereinafter be described according to the preferred embodiment wherein the interior surface portion 16 is carpet material; however, it should be appreciated that according to alternate embodiments the interior surface portion 16 could also include, for example, a vinyl material or a textile material. According to a preferred embodiment, the carpet material 16 is a polypropylene material with a polyester backing. The carpet material 16 is attached to the first portion 12 and the second portion 14 such that the carpet material 16 forms an integral or living hinge 18 at a gap 19 between the first portion 12 and the second portion 14. The first portion 12 of the panel member 10 defines a plurality of solid horizontally disposed ribs 20 and solid vertically disposed ribs 21. The solid ribs 20 and 21 are normal to each other so as to increase strength and rigidity and provide substantial load-bearing capability. According to a preferred embodiment of the present invention, the second portion 14 of the panel member 10 includes a plurality of up-standing clip attach members 22.

The clip attach members 22 preferably each retain a metallic attachment clip (not shown) configured to mount the second portion 14 of the panel member 10 to a seat assembly (not shown). When the seat assembly is in an upright position, the hinge 18 allows the second portion 14 of the panel member 10 to fold underneath the first portion 12 and below the seat.

When the seat assembly (not shown) is fully retracted, the first portion 12 of panel member 10 is rotatable about the integral hinge 18 from an open position exposing the seat assembly to a closed position at which the seat assembly is covered. When the seat assembly is fully retracted and the first portion 12 of panel member 10 is in the closed position, the carpet material 16 (shown in FIG. 3) is exposed and the seat assembly is completely hidden. In this manner, the panel member 10 is adapted to provide an aesthetically pleasing carpeted interior when the seat assembly is retracted, and also provide substantial floor-strength.

Referring to FIG. 2, a method for manufacturing the panel member 10 according to the present invention is shown. At step 50, the carpet material 16 is placed into a mold cavity 70 (shown in FIG. 4b) configured to produce the panel member 10. Optionally, at step 50, metal inserts such as bars and/or tubes (not shown) can also be placed into the mold cavity 70 with the carpet material 16 to produce a panel member 10 with increased strength and rigidity. The mold cavity 70 of the present invention preferably includes a first chamber 72 (shown in FIG. 4b) adapted to form the first portion 12 of the panel member 10, and a second chamber 74 (shown in FIG. 4b) adapted to form the second portion 14 of the panel member 10. The first and second chambers 72, 74 are preferably separated by an insert or feature 75 (shown in FIG. 4b) configured to produce the integral hinge 18 (shown in FIG. 3). At step 52, molten plastic material 76 (shown in FIG. 4a) is injected into the first chamber 72 of the mold cavity 70. The molten plastic material 76 is preferably injected in a conventional manner, such as, for example, by a reciprocating screw type injection device (not shown), through an injector nozzle 40 (shown in FIG. 4a), through a valve gate 42a (shown in FIG. 4a), and into the first chamber 72 of the mold cavity 70.

At step 54, an inert gas 80 (shown in FIG. 4b) such as nitrogen is injected into the first chamber 72 of the mold cavity 70 (shown in FIG. 4b) through a plurality of gas pins 82 (shown in FIG. 4b) positioned at locations predefined by the desired locations of the hollow ribs 30. The gas 80 preferably does not mix with the molten plastic material 76, but takes the path of least resistance through the less viscous portions of the plastic melt. The molten plastic 76 is therefore pushed against the wall portions of the mold cavity 70, which forms channels 31 and produces the hollow ribs 30 (shown in FIGS. 1 and 3).

Referring to FIG. 3, a sectional view taken through section A-A of FIG. 1 is shown. It can be seen in FIG. 3 that the hollow ribs 30 define an internal chanel 31 through which the gas is injected. Referring again to FIG. 1, the gas 80 (shown in FIG. 4b) is preferably injected through the gas pins 82 (shown in FIG. 4b) into the first portion 12 of the panel member 10 at the gas injection locations 32. According to a preferred embodiment, the hollow ribs 30 are generally located around the periphery of the first portion 12 of the panel member 10 as well as in an X-shape originating at the center of the first portion 12 and extending toward the corners thereof. It has been observed that the hollow ribs 30 formed in the manner described increase the rigidity and strength of the first portion 12 of the panel member 10. The increased strength and rigidity is particularly advantageous for the preferred embodiment wherein the panel member 10 is implemented as a load bearing floor panel.

Referring again to FIG. 2, at step 56 molten plastic material 76 (shown in FIG. 4a) is injected into the second chamber 74 of the mold 70 (shown in FIG. 4b). The molten plastic material 76 is preferably injected through the injector nozzle 40 (shown in FIG. 4a), through a valve gate 42b (shown in FIG. 4a), and into the second mold chamber 74.

Figure 4A:
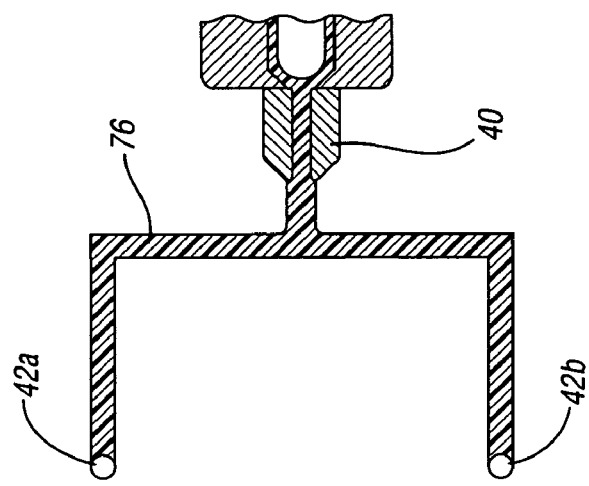
FIG. 4a is a schematic sectional view of an injection molding nozzle and a plurality of valves.

A sequential gating process is preferably implemented to perform previously described steps 52 and 56. Referring to FIGS. 4a-4b, the valve gates 42a and 42b, which are adapted to feed the first and second mold chambers 72, 74, respectively, are opened using the sequential gating process. In other words, the sequential gating process is implemented to control the timing of the gates 42a, 42b and to coordinate the operation of valve gate 42b with the operation of valve gate 42a. According to a preferred embodiment, the valve gates 42a and 42b are configured to open and close at a predetermined time. The predetermined time at which the valve gates 42a and 42b open and close is generally based on the needs of the specific part to be molded and type of material being used. Alternatively, the valve gates 42a and 42b may be opened and closed based on the position of a screw type injection device (not shown).

Referring again to FIG. 2, at step 58 the molten plastic material 76 (shown in FIG. 4a) that was injected into the first and second chambers 72, 74 of the mold cavity 70 (shown in FIG. 4b) at steps 52 and 56 is allowed to cool and solidify. Thereafter, at step 60, the pressurized gas 80 (shown in FIG. 4b) that was injected in to the first chamber 72 of the mold cavity 70 at step 54 is allowed to vent through the gas pins 82 (shown in FIG. 4b). At step 62, the finished panel member 10 is removed from the mold cavity 70.

It should be appreciated that the order in which the steps 50-62 of the preferred embodiment are performed may be varied according to alternate embodiments. For example, according to one alternate embodiment of the present invention, step 56 at which the molten plastic material 76 (shown in FIG. 4a) is be injected into the second chamber 74 (shown in FIG. 4b) of the mold cavity 70 (shown in FIG. 4b) may be performed before step 52 at which molten plastic material 76 is injected into the first chamber 72 (shown in FIG. 4*b*) of the mold cavity 70. According to yet another alternate embodiment, steps 52 and 56 may be performed simultaneously such that molten plastic 76 is injected into the first and second chambers 72, 74 of the mold cavity 70 simultaneously.

While the best modes for carrying out the invention have been described in detail, those familiar with the art to which this invention relates will recognize various alternative designs and embodiments for practicing the invention within the scope of the appended claims.

The invention claimed is:

1. A method for manufacturing a load bearing panel member having a first portion, a second portion, and an appearance surface portion, said method comprising:
    inserting the appearance surface portion of the panel member into a mold cavity having a first chamber, a second chamber, and a mold feature configured to separate the first chamber and the second chamber such that the appearance surface portion spans the first and second chambers and the mold feature; wherein said first and second chambers and said mold feature are configured to produce an integral hinge between the first portion and the second portion of the panel member;
    sequentially opening a plurality of valve gates configured to control the transfer of molten plastic into the first and second chambers of the mold;
    transferring molten plastic into the first and second chambers of the mold according to the sequence dictated by the valve gates, wherein said transferring occurs without expelling plastic from one of said first and second chambers into the other of said first and second chambers;
    transferring said molten plastic into said first chamber in a manner to form:
        a first plurality of horizontally disposed ribs;
        a second plurality of vertically disposed ribs orthogonal to and bisecting the first plurality of horizontally disposed ribs;
        a third plurality of ribs generally located around the periphery of the first portion;
        a fourth plurality of ribs originating in an X-shape and extending to the periphery of the first portion, wherein each of the fourth plurality of ribs is non-orthogonal to another of the fourth plurality of ribs and non-orthogonal to the third plurality of ribs;
    injecting pressurized gas into said first chamber of the mold cavity through a single gas pin in fluid communication with each of the fourth plurality of ribs in a manner to form a tubular cavity inside each of the fourth plurality of ribs;
    injecting said pressurized gas into said first chamber of the mold cavity through a plurality of peripheral gas pins in fluid communication with said third plurality of ribs in a manner to form a tubular cavity inside each of the third plurality of ribs;
    cooling the molten plastic in the first and second chambers; and
    venting the pressurized gas from the first chamber of the mold cavity.

2. The method of claim 1, wherein said sequentially opening a plurality of valve gates includes opening a first valve gate to allow the transfer of molten plastic into the first chamber of the mold and thereafter opening a second valve gate to allow the transfer of molten plastic into the second chamber of the mold.

3. The method of claim 1, wherein said sequentially opening a plurality of valve gates includes opening a first valve gate to allow the transfer of molten plastic into the second chamber of the mold and thereafter opening a second valve gate to allow the transfer of molten plastic into the first chamber of the mold.

4. The method of claim 1, wherein said step of injecting pressurized gas into said first chamber of the mold cavity includes injecting pressurized nitrogen gas into said first chamber of the mold cavity.

5. The method of claim 1, wherein said inserting the appearance surface portion of the panel member includes inserting an appearance surface portion composed of a carpet material.

6. The method of claim 1, wherein said transferring said molten plastic into said first chamber in a manner to form said fourth plurality of ribs includes forming said fourth plurality of ribs such that each of said fourth plurality of ribs obliquely bisects at least one of said first plurality of ribs and obliquely bisects at least one of said second plurality of ribs.

7. The method of claim 1, wherein said first chamber and said second chamber are sufficiently separated by said mold feature during the molding process such that the appearance surface portion which spans said mold feature remains uncoated by molten plastic.

8. The method of claim 1, wherein said mold feature is a surface of the mold cavity.

9. The method of claim 1, wherein said mold feature is an insert.

10. The method of claim 1, wherein said sequentially opening a plurality of valve gates includes simultaneously opening a first valve gate to allow the transfer of molten plastic into the first chamber of the mold and opening a second valve gate to allow the transfer of molten plastic into the second chamber of the mold.

11. The method of claim 1, wherein said sequentially opening a plurality of valve gates includes simultaneously opening a first valve gate to allow the transfer of molten plastic into the second chamber of the mold and opening a second valve gate to allow the transfer of molten plastic into the first chamber of the mold.

12. A method for manufacturing a load bearing panel member having a first portion, a second portion, and an appearance surface portion, said method comprising:
    inserting the appearance surface portion of the panel member into a mold cavity having a first chamber, a second chamber, and a mold feature configured to separate the first chamber and the second chamber such that the appearance surface portion spans the first and second chambers and said mold feature;
    sequentially opening a plurality of valve gates configured to control the transfer of molten plastic into the first and second chambers of the mold;
    transferring molten plastic into the first and second chambers of the mold according to the sequence dictated by the valve gates, wherein said transferring occurs without expelling plastic from one of said first and second chambers into the other of said first and second chambers to form a first plurality of ribs, a second plurality of ribs, and a third plurality of ribs;
    wherein the first plurality of ribs is formed orthogonally to the second plurality of ribs, and the third plurality of ribs are obliquely intersecting and non-orthogonal to the first and second plurality of ribs;
    injecting pressurized gas into said first chamber of the mold cavity and into each of the third plurality of ribs in a manner to form a plurality of generally cylindrical internal channels in the third plurality of ribs, wherein each of the plurality of generally cylindrical internal channels is in fluid communication with at least another of the plurality of generally cylindrical internal channels, and each of the plurality of generally cylindrical internal channels obliquely bisects at least one rib of the first plurality of ribs and at least one rib of the second plurality of ribs;

cooling the molten plastic in the first and second chambers; and venting the pressurized gas from the first chamber of the mold cavity.

13. The method of claim 12, wherein said first chamber and said second chamber are sufficiently separated by said mold feature during the molding process such that the appearance surface portion which spans said mold feature remains uncoated by molten plastic.

* * * * *